C. C. Savery,
Provision Safe.
No. 96,487.   Patented Nov. 2. 1869.
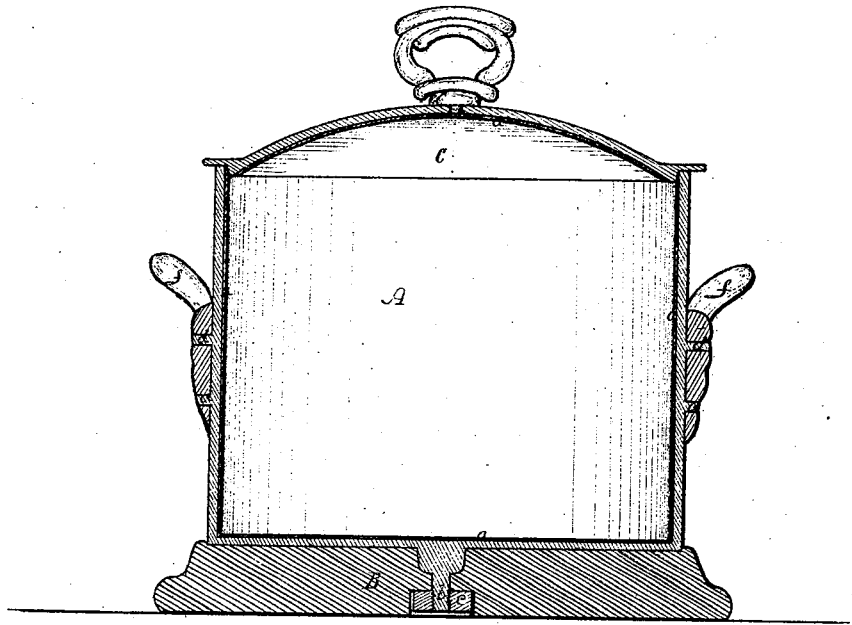
Witnesses:—
C. A. Harkness
James Sheehy
Charles C. Savery,
By his attorney,
J. S. Brown.

United States Patent Office.

CHARLES C. SAVERY, OF PHILADELPHIA, PENNSYLVANIA, ASSIGNOR TO BARROWS, SAVERY & CO., OF SAME PLACE.

Letters Patent No. 96,487, dated November 2, 1869.

IMPROVED BREAD AND CAKE-RECEPTACLE.

The Schedule referred to in these Letters Patent and making part of the same

*To all whom it may concern:*

Be it known that I, CHARLES C. SAVERY, of Philadelphia, in the county of Philadelphia, and State of Pennsylvania, have invented an Enamelled-Iron Bread and Cake-Receptacle; and I do hereby declare that the following is a full and exact description thereof, reference being had to the accompanying drawing, making part of this specification, and representing a central vertical section of the receptacle.

The invention consists in a receptacle for bread and cake, having the iron body A and cover C enamelled on the inner surface, as represented at $a$; this being a new article of manufacture, and possessing peculiar advantages, since it is entirely free from corrosion, and can always be kept perfectly sweet and clean, and consequently never liable to sour, taint, or otherwise injure the bread or cake placed within it.

The form of the receptacle may be as indicated, or any other which may suit the taste or convenience.

It is preferable to secure the body A to a wooden base, B, and in order to unite these, a screw-bolt, $b$, is cast in the bottom of the receptacle, so as to project downward therefrom a sufficient length to extend through the base B, and receive a nut, $c$, sunk therein, as represented.

Handles $ff$ are also attached to the sides of the receptacle. They are cast separate, and are secured to the receptacle by short pieces of wire, $d\,d$, cast in the sides of the body A, and projecting therefrom outward, so as to form rivets, which fit into holes in the handle-flanches, and are secured therein by heading.

What I claim as my invention, and desire to secure by Letters Patent, is—

The general construction of the bread and cake-receptacle, with iron body A and cover C, both enamelled on the interior surface, and the wooden base B attached to the body A, all substantially as herein specified.

CHARLES C. SAVERY.

Witnesses:
 Jos. H. CHUBB,
 C. W. CLOSE.